Figure 1:
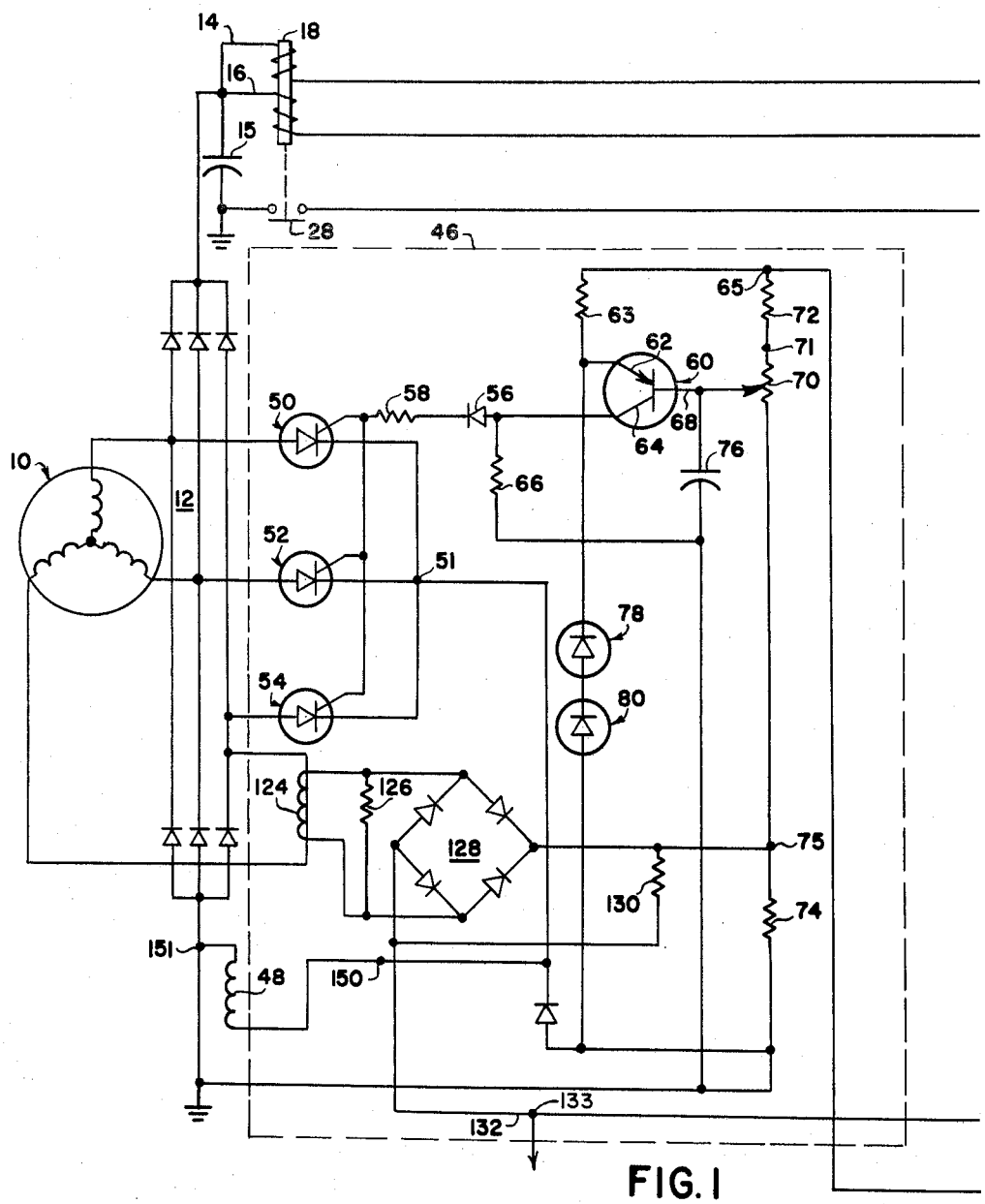

Dec. 28, 1965 L. KLEIN 3,226,559
CONTROL SYSTEM FOR D.C. GENERATOR
Filed Jan. 30, 1962 3 Sheets-Sheet 1

INVENTOR.
LEON KLEIN
BY Isidore Match
ATTORNEY

Dec. 28, 1965 L. KLEIN 3,226,559
CONTROL SYSTEM FOR D.C. GENERATOR
Filed Jan. 30, 1962 3 Sheets-Sheet 2

INVENTOR.
LEON KLEIN
BY Isidore Match
ATTORNEY

INVENTOR.
LEON KLEIN
BY Isidore Match
ATTORNEY

United States Patent Office 3,226,559
Patented Dec. 28, 1965

3,226,559
CONTROL SYSTEM FOR D.C. GENERATOR
Leon Klein, Waynesboro, Va., assignor to General Electric Company, a corporation of New York
Filed Jan. 30, 1962, Ser. No. 169,855
6 Claims. (Cl. 307—57)

This invention relates to electric generating systems. More particularly, it relates to a D.C. generating system including a novel and improved control arrangement.

In D.C. generating arrangements wherein a single D.C. generating system is arranged in parallel with like systems, a common problem which is encountered is the deleterious effect on the parallel arrangement when a fault occurs in a single system component. For example, such effect may be an actual shorting of the main buss to ground to disable the whole system.

Another problem encountered in D.C. generating arrangements is the occurrence of a feeder fault therein. In such situation, means have to be provided to disable this system to prevent the fault from affecting the parallel arrangement.

A particular pressing problem encountered in D.C. generating systems is the need for detecting whether or not the generator is actually producing an output.

A further problem which is encountered in parallel arrangements is the effecting of proper load sharing between the component D.C. generating systems in the arrangement.

Accordingly, it is an object of this invention to provide a control system for a D.C. generating arrangement which effects rapid disabling of the arrangement upon the occurrence of a fault therein.

Another object of the invention is to provide means in accordance with the preceding object for properly regulating the output of the system.

A further object is to provide means in accordance with the preceding objects for proper load sharing when a plurality of generating systems are arranged in parallel.

Generally speaking and in accordance with the invention, there is provided in combination with D.C. generating means comprising a shunt field and having feeder means associated therewith, means responsive to a fault on the feeder means for disabling the generating means, means in circuit with the generating means and the shunt field for providing current to the shunt field and means responsive to the presence of an output on the feeder means for providing an indication of such output.

The features of this invention which are believed to be new are set forth with particularity in the appended claims. The invention itself, however, may be best understood by reference to the following description when taken in conjunction with the accompanying drawings which show an embodiment of a control system in accordance with the invention.

Figure 3:
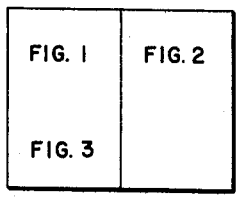
Figure 2:
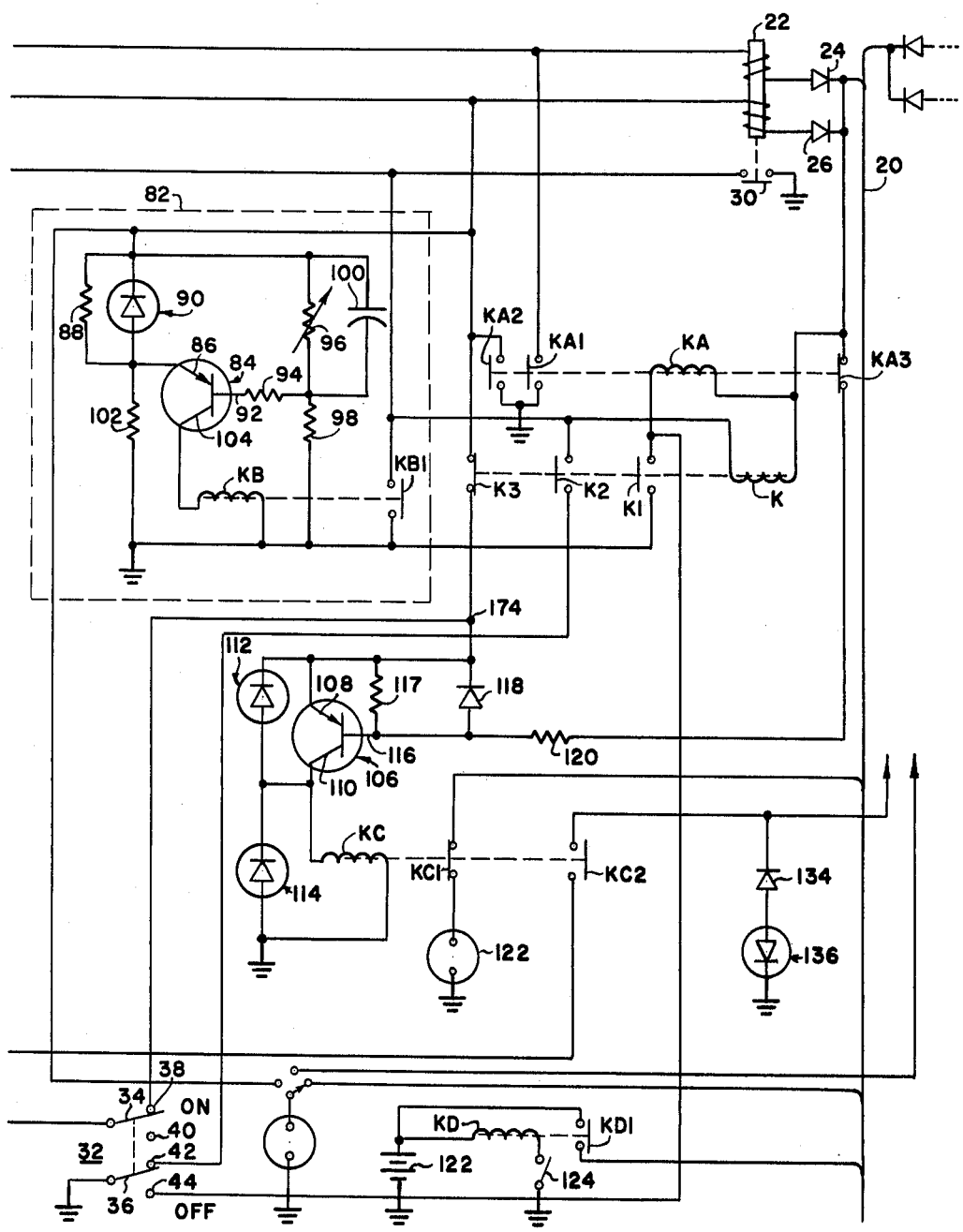

In the drawings, FIGS. 1 and 2 taken together as in FIG. 3 is a schematic diagram of a control system circuit in accordance with the invention.

Figure 4:
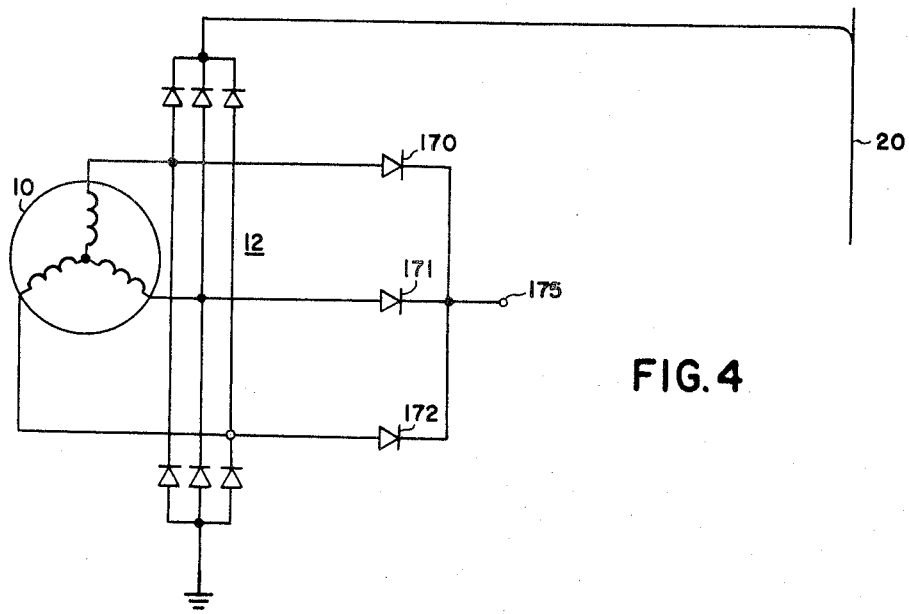
Figure 5:
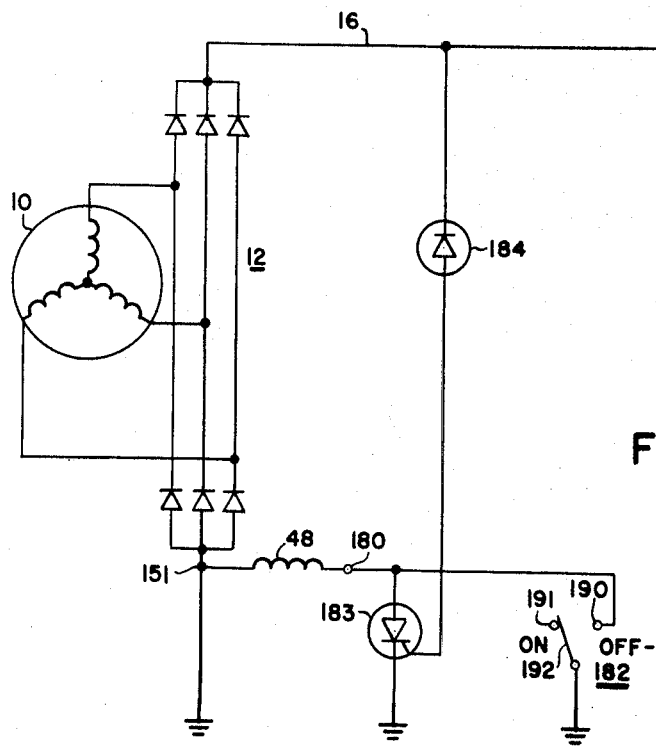

FIG. 4 is a schematic diagram of a second embodiment of a voltage sensing arrangement utilizable in the system of FIGS. 1–3; and FIG. 5 is a schematic depiction of an arrangement for effecting instantaneous deenergization of the generator of the system of FIGS. 1–3.

Referring now to FIGS. 1–3, a generator 10 which may suitably be of the brushless type and comprising a three phase winding has its three phase outputs respectively applied to a full-wave rectifier bridge generally designated by the numeral 12. In rectifier bridge 12, the outputs of the generator are full-wave rectified and combined and appear as a substantially unidirectional potential on twin-feeders 14 and 16. The output of bridge 12 is filtered in a capacitor 15.

Substantially adjacent the generator ends of feeders 14 and 16, there is provided a relay comprising a magnetic core 18, the operating windings of which are feeders 14 and 16, feeders 14 and 16 being wound around core 18 in opposite directions. Substantially adjacent the main buss 20 ends of feeders 14 and 16 is a relay similar to the relay comprising core 18 and comprising a magnetic core 22 whose operating windings are also feeders 14 and 16, the feeders also being wound around core 22 in opposite directions. The outputs on feeders 14 and 16 respectively are provided to main buss 20 through forward poled rectifiers 24 and 26.

Associated with the relay comprising core 18 are a pair of normally open contacts 28, one of the latter contacts being connected to ground, and associated with the relay comprising core 22 are a pair of normally open contacts 30, one of these contacts also being connected to ground.

Included in the system is a generator switch 32 comprising a pair of ganged rotors 34 and 36 and comprising pairs of fixed poles 38 and 40, and 42 and 44 respectively. As will be shown further hereinbelow, when rotors 34 and 36 are connected to poles 38 and 42 respectively, i.e., when the switch is in the ON position, the voltage regulator 46 which controls the amount of current applied to the shunt field 48 of generator 10 is connected in circuit and the system is conditioned to receive flashing current to provide initial build-up for the generator. Also, when switch 32 is in the ON position, then in the event that a fault occurs in the system, there is enabled a rapid disabling of the system. When switch 32 is in the OFF position, the system is not energized.

Considering the operation of the system of FIGS. 1–3 as described thus far, in normal operation, i.e., with substantially equal current flowing in feeders 14 and 16, the opposite directional windings of feeders 14 and 16 around cores 18 and 22 produce a substantially zero net flux therein and the relays remain deenergized. However, in a situation where a fault exists in one of the feeders such as an open circuit, a high resistance contact, or a short circuit to ground, then a net flux will appear in either or both of cores 18 and 22 respectively to energize one or both of them with the consequent closing of contacts associated therewith whereby the system is disabled. The energization of core 18 will generally occur in most feeder fault situations where there is no, or there is a light load on buss 20 and the energization of core 22 probably will occur when the load on the main buss exceeds a given level.

Where one of the feeders are shorted to ground, the net flux in cores 18 and/or 22 will, of course, disable the system. If the system of FIGS. 1–3 is being utilized in parallel operation with other similar systems or with batteries and other electric power sources, rectifiers 24 and 26 prevent short circuit current from being supplied from the main buss to the shorted feeder whereby the malfunctioning of one system in a parallel arrangement does not deleteriously affect the functioning of the whole arrangement, i.e., provide a short to ground for the main buss.

When one of cores 18 or 22 are energized, then the contacts associated with the energized relay close. With the closing of one of these sets of contacts, a circuit is completed to ground from the main buss 20 through the operating coil of a relay K whereby relay K is energized. With the energization of relay K, normally open contacts K1 and K2 associated with relay K assume the closed position and normally closed contacts K3 associated with relay K assume the open position. With the occurrence of these events, a path is completed to ground through the operating coil of relay K and now closed contacts K2 whereby relay K is locked in. Also, a path is completed to ground from main buss 20 through the operating coil of a relay KA and now closed contacts K1 to energize relay KA whereby normally open contacts KA1 and KA2 assume the closed position to short the outputs on feeders 14 and 16 to ground and normally closed contacts KA3 assume the open position to prevent current from being fed to transistor 106. The opening of contacts K3 due to the energization of relay K thus disconnects feeders 14 and 16 from voltage regulator 46 whereby no current is supplied to shunt field 48 and generator 10 is deenergized. The system is further deenergized by the action of the contacts of relay KA which shorts the output on feeders 14 and 16 to ground and prevents a flow of current through shunt field 48. Accordingly, with the relay logic provided by the relays comprising cores 18 and 22 and their respectively associated contacts, relay K and its associated contacts, and relay KA and its associated contacts, when a fault occurs on one of the feeders, the output on the feeders is shorted to ground and the voltage supply is removed from voltage regulator 46 to consequently remove the current supply for shunt field 48.

To normally provide current to shunt field 48, the output windings of generator 10 are connected to the anodes of silicon controlled rectifiers 50, 52 and 54. The cathodes of silicon controlled rectifiers 50, 52 and 54 are joined and their junction 51 is connected to shunt field 48. The output from connector 64 is applied to the gate electrodes of silicon controlled rectifiers 50, 52 and 54 through the series arrangement of a forward poled diode 56 and a resistor 58. Accordingly, when transistor 60 is providing an output, the positive current supplied to the gate electrodes of the silicon controlled rectifiers renders them conductive whereby the current from the cathodes of the silicon controlled rectifiers is supplied to shunt field 48. It is seen that in normal operation, silicon controlled rectifiers 50, 52 and 54 respectively are sequentially rendered conductive in accordance with the balanced phase displacement of the outputs of generator 10.

In the event that the voltage on feeders 14 and 16 exceeds a desired operating voltage level, then there is no output from transistor 60 whereby silicon controlled rectifiers 50, 52 and 54 are not rendered conductive while such overvoltage condition exists and no current is provided to shunt field 48.

In voltage regulator 46, the emitter 62 of a transistor 60 is connected to a feeder such as feeder 16 through a resistor 63 normally closed contacts K3 and switch 32 when switch 32 is in the ON position. Emitter 62 is also connected to point 65 through a resistor 63. The collector 64 is connected to ground through a resistor 66. The base 68 is connected to point 65 through a portion of a variable resistor 70 and a resistor 72 and is connected to ground through the other portion of variable resistor 70 and a resistor 74, a filter capacitor 76 being interposed between base 68 and ground. Connected between emitter 62 and ground is the series arrangement of the cathode to anode paths of reference diodes 78 and 80, reference diodes 78 and 80 suitably being Zener diodes.

In the operation of voltage regulator 46, the values of resistors 63, 66, 70, 72 and 74 are so chosen whereby transistor 60 is normally conductive and positive gating current is provided sequentially to the respective gate electrodes of silicon controlled rectifiers 50, 52 and 54 through forward poled diode 56 and resistor 58. The Zener diodes 78 and 80 serve to maintain the potential between emitter 62 and ground at a substantially constant value. In the event that the voltage at junction point 65 rises above a chosen value, i.e., a selected safe value, such rising, of course, occuring when the voltage on the feeders exceeds a desired value, transistor 60 is rendered nonconductive whereby silicon controlled rectifiers 50, 52 and 54 do not receive positive gating current to render them conductive.

Consequently, no current is supplied to shunt field 48. It is, of course, appreciated that when a fault occurs in one or both of the feeders 14 or 16, the consequent energization of relay K, as has been explained hereinabove, causes the opening of normally closed contacts K3 whereby the voltage supply for transistor 60 from feeder 16 is removed.

Stage 82 is a relay circuit which functions to disable the system when overvoltages occur at the output of generator 10. Since, in the latter situation, the voltages are equal on both feeders, relays K and KA are not directly energized when an overvoltage occurs whereby an overvoltage relay is needed to provide protection in such situation.

The overvoltage relay stage comprises a transistor 84 having an emitter 86 connected to feeder 16 through a resistor 88, the anode to cathode path of a Zener diode 90 being provided in shunt with resistor 88 to maintain a relatively constant voltage between feeder 16 and emitter 86. The base 92 of transistor 84 is connected to feeder 16 through a resistor 94, and a variable resistor 96 and is connected to ground through resistor 94 and a resistor 98, a time delay capacitor 100 being provided connected in shunt with variable resistor 96. Emitter 86 is also connected to ground through a resistor 102 and the collector 104 is connected to ground through the operating coil of a relay KB.

The values of the resistors in the overvoltage relay circuit 82 are so chosen whereby when there is no overvoltage, transistor 84 is biased to nonconductivity. When such overvoltage occurs, however, transistor 84 is rendered substantially fully conductive whereby relay KB is energized and normally open contacts KB1 associated therewith consequently assume the closed position. With contacts KB1 closed, a circuit is completed from main buss 20 to ground through the operating coil of relay K and now closed contacts KB1 whereby the lockout cycle provided by relay K occurs as described hereinabove and the system is disabled.

A transistor 106 and its associated circuit components comprise an arrangement for indicating whether generator 10 is supplying power to buss 20 through feeders 14 and 16 and for providing flashing current to generator 10 in the event that generator 10 has not built-up to its normal voltage.

Transistor 106 comprises an emitter 108 connected to junction point 65 in voltage regulator 46 through switch 32 when switch 32 is in the ON position. Emitter 108 is also connected to collector 110 through the cathode to anode path of a reference diode 112 which may also suitably be a Zener diode, diode 112 preventing the emitter to collector voltage from exceeding a selected safe value. Collector 110 is connected to ground through the parallel combination of the operating coil of a relay KC and the cathode to anode path of a diode 114, diode 114 serving to suppress transient surges through relay KC. Base 116 is connected to emitter 108 through the parallel combination of a resistor 117 and the anode to cathode path of a diode 118 and is also connected to main buss 20 through a resistor 120 and normally closed contacts KA3 associated with relay KA.

In the operation of the circuit comprising transistor 106 and its associated circuit components, the values of such components are normally so chosen whereby with an output from generator 10 appearing on feeders 14 and 16 and across rectifiers 24 and 26 in the forward polarity, transistor 106 is conductive and relay KC is energized. Consequently, normally closed contacts KC1 associated with relay KC and a normally energized indicating light 122 is extinguished. In the event, however, that there is no output from generator 10, then the input to base 116 becomes sufficiently positive to render transistor 106 nonconductive whereby relay KC is deenergized. With the de-energization of relay KC, normally closed contacts KC1 associated therewith remain closed whereby indicating light 122 is illuminated. Normally open contacts KC2 associated with relay KC close when transistor 106 conducts, i.e., with an output on feeders 14 and 16, such closing enabling load sharing of a parallel arrangement of like systems such as depicted in FIGS. 1–3 as will be further described hereinbelow.

Since the voltage present on main buss 20 may go higher than the voltage output from generator 10 under certain operating conditions, diode 118 is connected across transistor 106 as a protective measure. Also, if a proper choice of values is made for the forward drop across diode 118 and the values of resistor 117 and resistor 120, the circuit comprising transistor 106 and its associated circuit components may also be utilized to provide flashing current to generator 10 during generator build-up. Thus, if generator 10 has not built up to its normal voltage, a small current flows from buss 20 through resistor 120, diode 118, switch 32 when switch 32 is in the ON position, to point 65 in voltage regulator 46. Consequently, transistor 62 is rendered conductive and flashing current is supplied to shunt field 48. The value of resistor 120 has to be chosen so as to provide the required amount of flashing current to shunt field 48 and still not permit higher values of current which can overheat the shunt field when the generator is not rotating or when it is not being cooled. In addition, the value of resistor 117 has to be chosen so as to prevent excessive shunt field current from causing voltage regulation problems and overvoltage trips during the build-up of the voltage of the generator. It is thus seen that with the proper selection of diode 118 and resistors 117 and 120, the circuit comprising transistors 106 and its associated circuit components can be utilized to provide the dual functions of indicating when the generator is or is not supplying power to the main buss and also supplying flashing current to the generator.

The circuit comprising battery 122 is the normal standby circuit for supplying battery current to the main buss. In this circuit, the negative pole of battery 122 is grounded and its positive pole is connected to one of normally open contacts KD1, the other of contacts KD1 being connected to main buss 20. The positive pole of battery 122 is connected to one terminal of the operating coil of a relay KD with which contacts KD1 are associated, the other terminal of the operating coil of relay KD being connected to the fixed pole of a battery switch 124. The rotor of switch 124 is connected to ground. It is seen that when switch 124 is closed, a circuit is completed to ground from the positive pole of battery 122 through the operating coil of relay KD whereby relay KD is energized, and contacts KD1 assume the closed position. Consequently, battery current is supplied to main buss 20.

Provision is made in the systems of FIGS. 1–3 to permit load sharing in the event that it is utilized in a parallel arrangement with a like or plurality of like systems. One arrangement for such load sharing could be to connect junction point 71 in voltage regulator 46 with the corresponding junction point in the voltage regulators of the other systems in the arrangement. In such arrangement, in the event that one system were carrying more than its share of the load, then the current flow would tend to render transistor 60 nonconductive and cut off the current supply to shunt field 48. In the event that it were carrying less than its share of the load, then a current would flow to increase conductivity in transistor 60 and thereby increase the current supply to shunt field 48.

Another arrangement for load sharing is as shown in FIGS. 1–3. In this arrangement the A.C. output of a winding of generator 10 is sensed in a current transformer 124 and an A.C. voltage proportional to generator load current is developed across resistor 126. This A.C. voltage is rectified in full wave rectifier 128.

The positive end of rectifier 128 is connected to the junction 75 of resistors 74 and 70. A resistor 130 is provided between the positive and negative output ends of full wave rectifier 128 and the negative end is connected to the corresponding negative output ends of like full wave rectifiers in other like systems in a parallel arrangement. It is, of course, realized that the connection between the negative end of full wave rectifier 128 and the respective negative ends of its counter parts can only be made when transistor 106 is conductive since normally open contacts KC2 associated with relay KC have to assume the closed position to make such connection. This signifies that an output is being provided on feeders 14 and 16.

In the operation of the load sharing arrangement, the positive side of the output from rectifier 128 is applied at junction 75. Current flows through resistor 130 to the corresponding points in the other systems in the parallel arrangement through point 133. Positive current through resistor 130 raises the voltage at base 68 of transistor 60 such that it is rendered nonconductive until the sensed voltage developed across resistor 126 decreases, thus effecting a lower voltage output. The opposite events occur in a generating system carrying less than its share of the load and the voltage regulator functions to provide more current to its shunt field.

It has been found advantageous to have the equalizing current flowing in lead 132 to increase substantially linearly up to a chosen point and then to abruptly cease increasing, i.e., to "saturate." If such saturation of equalizing current were not so utilized, a situation could exist, for example, with two generating systems in a parallel arrangement, wherein if one system were slowed down to the point where it could not build-up to enough output voltage to carry its share of the load, the other system would therefore carry more than its share of the load. Consequently, the equalizing signal through lead 132 at point 133 would tend to increase excitation of the one system and decrease that of the other system.

Since the one system's excitation could not increase, the other system would follow the one system in a decreasing direction until neither would be carrying enough load thereby causing a loss of power.

In the load sharing arrangement shown in FIGS. 1–3, resistor 130 biases rectifier 128 such that when the amount of negative current flowing in the equalizing circuit, i.e., through resistor 130 is large enough to place rectifier 128 in the blocking state, the current is confronted with the resistance presented by resistor 130 whereas previously it had been confronted by the parallel combination of resistors 126 and 130. The arrangement including resistors 126 and 130 accordingly introduces a sharp nonlinearity into the equalizing circuit when the current through resistor 130 attains a chosen value.

The series arrangement of the cathode to anode path of a diode 134 and the anode to cathode path of a Zener diode 136 connected between lead 132 and ground serves to limit the negative value of the voltage on lead 132 and at point 133. This series arrangement functions to control the level of the saturation point in the equalizing arrangement. Diode 134 blocks current through Zener diode 136 in the forward direction.

In addition, diode 134 in conjunction with Zener diode 136 will act under heavy loads to reduce the output voltage of generator 10 thereby reducing the output current of generator 11. When the output signal from rectifier 128 exceeds a selected level, Zener diode 136 operates in a conducting state to increase the current flow through resistor 74 thereby decreasing the generator output voltage as described hereinabove. This series of events occurs whether the generator is used singly or in a parallel arrangement with like generators.

In some applications, it may be desirable to operate the system without rectifiers 24 and 26 and without relays 18 and 22. The system can still operate and provide the indicating and voltage regulation function. Other sources of voltage may be applied to main buss 20 from batteries or other generators. With the system as shown in FIGS. 1–3, proper sensing of the voltage output of generator 10 is obtained from feeder 16 wherein rectifiers 24 and 26 block the voltage from other power sources that may be connected to main buss 20. If rectifiers 24 and 26 are not inserted in the system, the voltage output of generator 10 can be sensed as shown in FIG. 4 by use of additional rectifiers 170, 171 and 172. Between point 175 and ground, the voltage output of the system is sensed. Point 175 can be connected to the indicator relay circuit and provide the same function as described hereinabove. In this case, the indicator relay senses the voltage drop across the positive set of rectifiers of the bridge rectifier 12. In using the circuit as shown in FIG. 4, point 175 is connected to point 174 of FIGS. 1–3 and the circuit in FIGS. 1–3 between contacts K3 and point 174 is disconnected.

In some applications, it may be desirable to instantaneously deenergize the system when an overvoltage condition occurs. In the arrangement of FIGS. 1–3, a time delay is introduced into the overvoltage relay 82 by means of capacitor 100. This may be necessary to override voltage transients due to load switching. An additional time delay to deenergize is introduced by the operating time of relays K and KA. In some applications for high overvoltages, an instantaneous deenergizing is desired. This may be accomplished by the arrangement as shown in FIG. 5.

In the arrangement shown in FIG. 5, a Zener diode 184 is connected to feeder 16. When the voltage between feeder 16 and ground exceeds the selected value, Zener diode 184 will conduct placing a positive potential on the gate electrode of a silicon controlled rectifier 183 to render it conductive. Consequently, the output on feeder 16 is rapidly shorted to ground, thereby decreasing the current supplied to shunt field 48. If the proper characteristics are selected for generator 10, shunt field 48 and silicon controlled rectifier 183, the above described action will reduce the voltage output on feeder 16 to a very low value, thereby removing the overvoltage. The small resultant voltage on feeder 16 or the flashing voltage described hereinabove will cause a current to flow through the anode of the silicon controlled rectifier 183 if point 180 of FIG. 5 is connected to point 150 of FIGS. 1–3. This will cause the silicon controlled rectifier 183 to be continuously conductive thereby deenergizing generator 10 without causing a cyclic operation. To reset the arrangement so that the generator may be reenergized, it is necessary to lower the current through the anode of the silicon controlled rectifier 183 below a certain value. This is accomplished in the arrangement of FIG. 5 by switch 182 wherein pole 190 is connected to the anode of the silicon controlled rectifier 183 and rotor 192 is connected to ground. When switch 182 is placed in the OFF-RESET position, rotor 192 is connected to pole 190 and current no longer flows through the anode of silicon controlled rectifier 183 and shunt field 48. When switch 182 is returned to the ON position, the generator will be reenergized and operate in the normal manner if the cause of the above-mentioned overvoltage condition no longer exists.

The arrangement shown in FIG. 5 can be incorporated into the arrangement of FIGS. 1–3 with the elimination of relays K and KA and a rearrangement of switch 32.

While there have been shown particular embodiments of this invention, it will, of course, be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed as new and desired to be secured by Letters Patent of the United States is:

1. In a parallel arrangement of a plurality of D.C. power sources including a main buss, each of the sources comprising a D.C. generator having a shunt field and output feeder means associated therewith for providing power to said buss, said feeder means comprising a pair of conductive lines; regulating means in combination with each of said D.C. sources, each of said regulating means comprising relay means having as operating windings thereon said lines, said lines being wound in opposite directions on said relay means whereby said relay means is energized in response to a fault in said feeder means, disabling means responsive to the energization of said relay means for disabling a power source in which said fault occurs, rectifier means in connected circuit with each of said feeder means and said buss in a polarity to block current flow from said buss to said feeder means, means in circuit with said feeder means and said shunt field for supplying current to said shunt field and means in circuit with said feeder means and responsive to an output of said generator for indicating the presence of said last-named output.

2. In a parallel arrangement of a plurality of D.C. generating systems including a main buss, each of said systems comprising a D.C. generator having a shunt field and a pair of output feeders associated therewith for providing power to said buss; regulating means in combination with each of said D.C. generating systems, each of said regulating means comprising relay means having as operating winding thereon said feeders, said feeders being wound in opposite directions on said relay means whereby said relay means is energized in response to a fault in one of said feeders, means responsive to the energization of said relay means for disabling a D.C. generating system in which said fault occurs, a pair of rectifiers respectively connected in circuit with a feeder and said buss in a polarity to block current flow from said buss to said feeders, means in circuit with feeders and said shunt field for supplying current to said shunt field and means in circuit with said feeders and responsive to the polarity of the voltage across said rectifiers for indicating the presence of a generator output.

3. In the arrangement defined in claim 2 wherein said relay means comprises magnetic core means having said feeders wound therearound in opposite polarities whereby a net flux is produced in said core means when a fault occurs on one of said feeders and wherein said disabling means comprises contacts associated with said relay means which change state upon the energization of said relay means to disable said system.

4. In the arrangement defined in claim 3 wherein said feeders are connected between said generator and said buss and wherein said relay means comprises a first magnetic core having said feeders wound therearound in respective opposite polarities and substantially adjacent the generator end of said feeders and a second magnetic core having said feeders wound therearound in opposite polarities and substantially adjacent the buss end of said feeders and wherein said disabling means comprise first contacts associated with said first core and second contacts associated with said second core.

5. In the arrangement defined in claim 2 wherein said indicating means includes active means, means for applying operating potentials to said active means, means for applying the output of said rectifiers as input to said active means, said active means being rendered conductive to produce an output only when there is a generator output on said feeders, said indicating means being energized in response to the conductivity state of said active means.

6. In the arrangement defined in claim 2 wherein said D.C. generator comprises an A.C. generator having a given plurality of balanced phase outputs and bridge rectifying means for rectifying and combining the outputs of said A.C. generator to produce a substantially unidirectional potential output, and wherein said means for supplying current to said shunt field comprises said given plurality of gate controlled rectifiers, each of said last-named rectifiers being in circuit with one of said A.C. generator outputs, a voltage regulator in circuit with said feeders which produces an output when the voltage on said feeders is equal to or less than a prescribed voltage, and means for applying the output of said regulator as an input to the gate electrodes of said gate controlled rectifiers, said gate controlled rectifiers being rendered conductive when there is an output from said regulator, said current being supplied to said shunt field when said gate controlled rectifiers are rendered conductive.

References Cited by the Examiner
UNITED STATES PATENTS

| | | | |
|---|---|---|---|
| 1,792,099 | 2/1931 | Kern | 321—12 |
| 1,873,964 | 7/1932 | Kern | 321—12 |
| 2,675,490 | 4/1954 | Portail | 307—48 |
| 3,045,167 | 7/1962 | Colaiaco | 317—26 X |

LLOYD McCOLLUM, *Primary Examiner.*